UNITED STATES PATENT OFFICE.

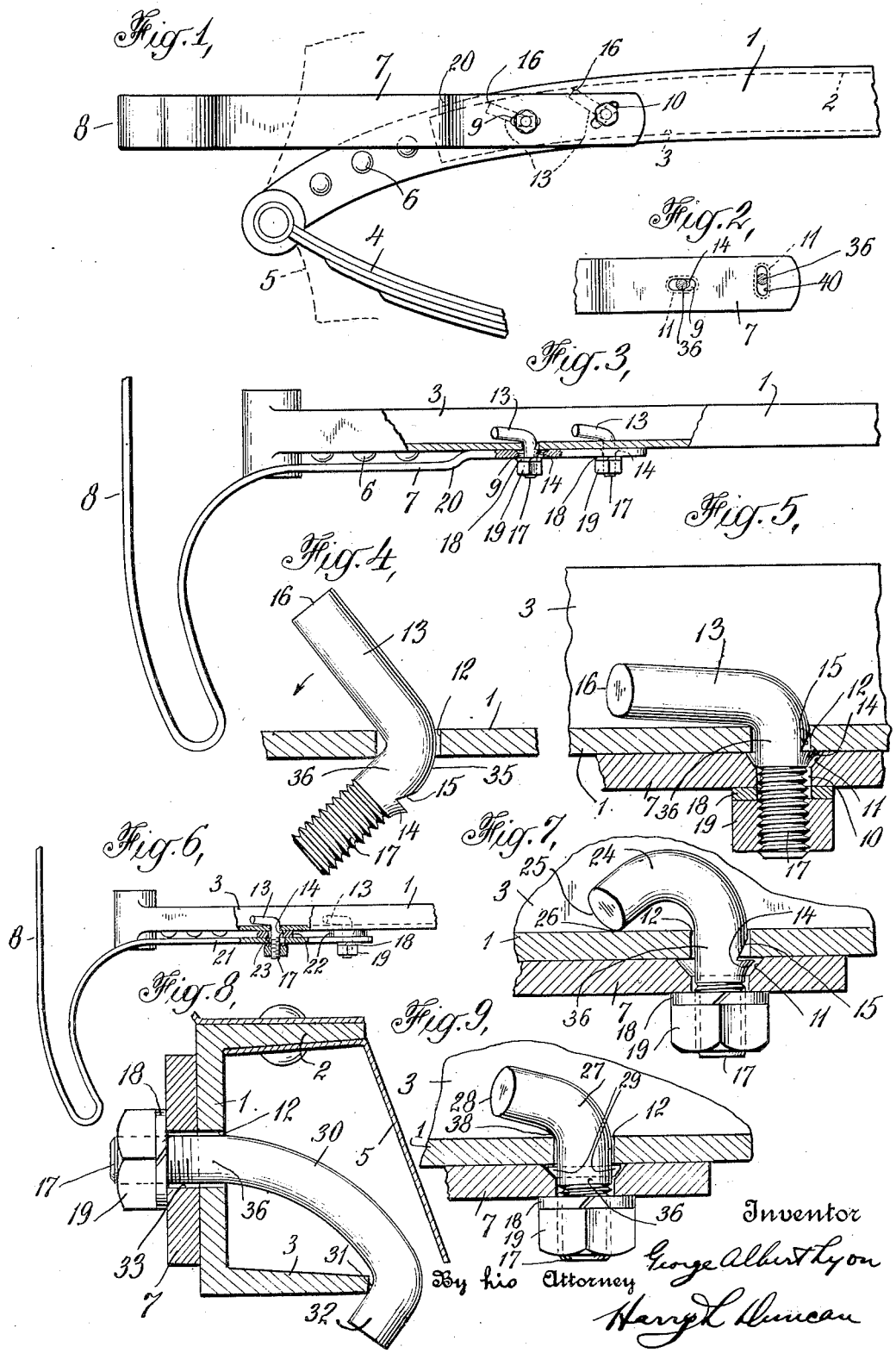

GEORGE ALBERT LYON, OF PHILADELPHIA, PENNSYLVANIA.

AUTOMOBILE-BUFFER ATTACHER.

1,358,687. Specification of Letters Patent. Patented Nov. 9, 1920.

Application filed February 14, 1919. Serial No. 276,899.

*To all whom it may concern:*

Be it known that I, GEORGE ALBERT LYON, a citizen of the United States, and resident of Philadelphia, Philadelphia county, Pennsylvania, have made a certain new and useful Invention Relating to Automobile-Buffer Attachers, of which the following is a specification, taken in connection with the accompanying drawing, which forms part of the same.

This invention relates especially to angle bolt or alining buffer attachers by which automobile buffers or bumpers or other fittings or attachments having supporting members may be secured or clamped to the frame members of automobiles or other vehicles which for this purpose may advantageously be formed with frame apertures. The frame members of standard automobiles, for instance, are usually of channel iron construction and one or more frame apertures may be formed in the web portion of such frame members at substantially a standard distance apart so as to be engaged by coöperating angle bolt attachers and conveniently and securely clamp or fasten the automobile bumper or other fitting, such as a snubber or shock absorber, in position. For this purpose the automobile buffer may be provided with resilient or other supporting members formed with slotted adjusting or other alining apertures which are preferably adapted to allow the desired angular adjustment of the buffer with respect to the automobile frame and also to accommodate any slight irregularity in the positioning of the frame apertures or the distance between them. The coöperating bumper attachers are provided with inserting bends of such shape or cross-section as to allow the angular end of the attacher to be inserted through one of these frame apertures and then to be turned around to bring the alining stem or shank of the attacher into normal securing position which is preferably substantially perpendicular to the frame web. It is also convenient to form a projecting retainer integral with or otherwise arranged on the alining stem of the attacher so as to prevent its undesirable movement into or through the frame member while the buffer supporting arms or members are being arranged on the alining stems of these attachers. Coöperating alining members, such as alining washers or nuts, can then be used to secure and clamp the parts in position, the adjusting or other apertures in the supporting members of the buffer also, if desired, fitting sufficiently closely to have considerable alining action in connection with these stems. In this way a strong and substantially rigid connection may be effected between the bumper and the automobile frame especially when as is desirable the attachers are formed with a retaining contact portion adjacent to or in line with the stem so that holding contact is secured adjacent the frame aperture. It is also desirable to have the angle portion of these apertures or angle bolts which may have any desired or convenient shape or contour extend sufficiently away from the frame aperture so as to prevent the undesirable rotation of the attacher when the alining securing nut is being screwed thereon as by having this restraining end engage one of the flanges of the automobile frame member.

In the accompanying drawing showing in a somewhat diagrammatic way various illustrative embodiments of this invention, Figure 1 is an elevation showing one type of attacher or angle bolt in securing position in connection with an automobile buffer and frame member.

Fig. 2 is a detail sectional elevation showing another arrangement of slotted adjusting apertures in the buffer supporting member.

Fig. 3 is a top view partly in section of the Fig. 1 arrangement.

Figs. 4 and 5 are enlarged detail sections thereof showing the insertion and securing clamping position of the attacher.

Fig. 6 is a top view partly in section showing another form of device; and

Figs. 7 to 9 are enlarged sectional views showing other forms of attachers.

The automobile or other vehicle buffer or bumper may be of any desired form and construction and may have a resilient or other front portion 8 to which is secured as by the interposed loop the resilient or other supporting members 7 which may in some cases have an offset portion 20 so that the supporting members are thus carried around any rivets 6 or other projections on the automobile frame. The frame member of the automobile may be of any desired channel iron or angle iron type of construction and as indicated in Figs. 1 and 8 the frame may comprise the web 1 and the integral frame flanges 2, 3 to which the usual mud guards and splash pan 5 may be riveted or otherwise secured. The rivet 6 may secure to the end of these frame members or goose necks the connection for the spring 4 or other part of the automobile. These frame ends may be conveniently formed with punched or other frame apertures, such as 12, which may be located at suitable distances from the ends of the frame members and at a substantially uniform distance apart so that the attachment of automobile buffers and other fittings may be facilitated. The supporting members of the automobile buffer may be formed with correspondingly separated apertures which may, if desired, be of the adjusting slot type, such, for instance, as the longitudinal adjusting slot or aperture 9 and the angularly arranged and vertically extending adjusting slot or aperture 10 shown in Fig. 1. If desired, however, such adjusting slot apertures may be of the type shown in Fig. 2 in which a similar longitudinal aperture 9 is formed in the supporting member of the buffer while a vertical adjusting slot or aperture 40 is shown to the rear thereof, so as to facilitate the angular adjustment or positioning of the buffer on the automobile by means of the alining stems 36 of the angle bolts or attachers extending through the slots or apertures.

Many suitable forms of angle bolt bumper attachers may be used in connection with such apertured automobile frame members even when the usual splash pan prevents ready access to the inner or rear face of the frame web; and Figs. 1 to 5 show a type of angle bolt which is satisfactory for this purpose. The inserting bend 35 of such a bolt is advantageously of such size and contour as to be readily turned within the frame aperture 12 in the direction indicated by the arrow in Fig. 4 after the angle portion 13 of the bolt has been inserted. And thereafter the bolt may be held or loosely retained in substantially the alined position shown in Fig. 5 by the action of a projecting retainer, such as 14, which may be formed in any desired way on the alining stem 36 of the bolt as by bending or forcing up this retainer during the bending or forging operation when a corresponding depression 15 may be simultaneously formed. Good results are secured when the frame apertures 12 are substantially round and of such size that the stem or shank of the attacher has about a 32nd of an inch clearance therein; and when the half inch round steel or other stock is bent up in dies to form the inserting bend of an attacher, this bent portion is readily formed of sufficiently reduced section so as to allow it to be readily turned within such a round frame aperture during the inserting operation when this frame web is $\frac{3}{16}$ of an inch or so thick. It is, of course, understood, however, that sometimes such frame apertures may be countersunk as shown in Fig. 7 to facilitate turning of the attacher or may be given other or special non-circular forms to suit other shapes or sections of attachers when desired. When, for instance, one or more such attachers have been inserted in each frame member and turned around so as to bring their stems substantially into securing position they naturally remain in substantially set position so that the coöperating supporting members of the automobile buffer may be put in place and the apertures therein brought into engagement with the projecting alining stems of the attachers without any great difficulty, so that this work can be done not only by the ordinary garage man, but also by the automobile owner himself which is desirable in many cases.

The alining stems 36 of these bolts may be formed with any desired type of fastening device, such as the threaded portions 17 and these alining stems are of such size and shape as to properly coöperate with the apertures in the supporting members of the automobile buffer, the slots or apertures 10 therein preferably fitting closely enough around these alining stems so as to prevent undesirable displacement when the parts are tightened. Other coöperating alining means may also be used in many cases, such as alining washers 18 which may also, if desired, have a locking action such as is possessed by the ordinary lock washers; and the securing nuts 19 may also with advantage fit tightly enough and have their inner faces trued up sufficiently to exert considerable alining action in connection with the coöperating parts or faces against which they are secured when the nuts are tightened on the alining stems of the bolts. During this action the bolt ends 16 may have a desirable restraining action when as indicated in Fig. 1, for instance, this restraining end 16 comes into engagement with one of the flanges of the automobile frame member so as to prevent further rotation of the angle bolt or attacher. The nuts 19 may thus be tightened up on the alining stems of the angle bolts with or without any such interposed locking alining washers as 18 so that the supporting member 7 of the buffer is tightly secured to the coöperating frame member 1 as shown in Fig. 5, the supporting member being preferably formed with the angular or other undercut portions or recesses 11 to accommodate the projecting retainers 14. This tightening action brings the holding or contact portion 13 of the angle bolt into tight holding engagement with the frame member, preferably closely adjacent the frame aperture and the aperture 10 in the supporting member of the buffer may as indicated fit sufficiently tightly around the alining stem to substantially prevent any undesirable angular movement. The parts can thus be held securely and rigidly enough to prevent undesirable rattling under running conditions of the automobile and under collision conditions the shearing strength of the angle bolts or attachers can readily be made much more than the crushing strength of the frame web so that the buffer support is amply strengthened under these conditions.

As shown in Fig. 6, the supporting member 21 of the buffer may in some cases be substantially straight at its rear portion so as to be parallel with the automobile frame member and it may, if desired, be supported somewhat away from the frame web by one or more interposed plates or washers 22 which may fit sufficiently tightly around the stem of one or more of the angle bolts or attachers so as to have a desirable alining action in connection therewith in addition to the alining action of the supporting members and other parts on these bolts. Fig. 7 shows another arrangement in which the end 25 of the angle bolt is bent still farther around so that the holding or contact portion may be at the point 26 closely adjacent the end of the bolt while its angle portion 24 may be bent around through rather more than a right angle with respect to the alining stem 36. One or more retainers, such as 14, may be formed on this stem and be accommodated in an annular or other countersunk recess 11 in the supporting member of the automobile buffer. In this type of attacher it is desirable to have the angle portion of the attacher relatively short so as to minimize bending stress which is naturally increased by the distance of the contact portion 26 away from the stem 36 of the bolt. Fig. 9 shows another form of attacher in which the angle portion 27 is bent around at somewhat less than a right angle as compared to the stem 36 of the bolt, the holding or contact portion of which is thus at 38 still closer to the frame aperture 12. In this case two projecting retainers 29 are shown which may be oppositely arranged in any desired position around the alining stem and these retainers may be in the form of one or more projecting pins inserted in or secured as indicated to the bolt stem with which may coöperate the washer 18 and nut 19 previously described. Fig. 8 shows still another form of attacher adapted to coöperate with such an apertured frame member. The stem 36 of this bolt may have the angularly extending portion 30 and the hook or holding portion 31 adjacent the end 32 of this angle bolt so as to thus hook around or engage one of the frame flanges 3. The end of the angle bolt may be inserted through the frame aperture 12 and the splash pan 5 may prevent sufficient further inward movement of the bolt so that it is unnecessary to form projecting retainers on its stem 36. This stem may as indicated pass through a slotted or other aperture 33 in the supporting member of the buffer or any other attachment or fitting which may be secured to the automobile frame as by the lock washer 18 and nut 19 on the threaded portion 17 of the bolt stem. In this case the aperture 33 in the supporting member 7 may be of somewhat larger size since it is not so necessary to have a close fitting alining engagement between these parts as in the other types of attachers described.

This invention has been described in connection with a number of illustrative embodiments, forms, proportions, sizes, parts, arrangements, and methods of manufacture and use, to the details of which disclosure the invention is not of course to be limited, since what is claimed as new and what is desired to be secured by Letters Patent is set forth in the appended claims:

1. In automobile buffers, an automobile having frame members provided with frame apertures, a buffer having supporting members adapted to coöperate with the frame members and formed with apertures, angle bolts having alining stems and having inserting bends adapted to be inserted and turned in said frame apertures so that said alining stems may be passed through said apertures in said supporting members and coöperating alining tightening means engaging said stems to securely clamp said supporting members to said frame.

2. In automobile attachment devices, an automobile having flanged frame members provided with frame apertures, an automobile attachment having a supporting member formed with alining apertures, angle bolts having threaded alining stems formed with projecting retainers to prevent its insertion into the coöperating frame aperture to an undesirable extent and having inserting bends adapted to be inserted in said frame apertures so that said alining stems may be passed through said alining apertures in said supporting member and coöperating tightening nuts to securely clamp said supporting member to said frame, projecting end portions being formed on said angle bolts to engage said frame members during the tightening operation.

3. In automobile attachment devices, an automobile having flanged frame members provided with frame apertures, an automobile attachment having a supporting member formed with alining apertures, angle bolts having threaded alining stems having inserting bends adapted to be inserted in said frame apertures so that said alining stems may be passed through said alining apertures in said supporting member and coöperating tightening nuts to securely clamp said supporting member to said frame.

4. In automobile attachment devices, an automobile having flanged frame members provided with frame apertures, an automobile attachment having a supporting member formed with apertures, angle bolts having threaded stems having inserting bends adapted to be inserted in said frame apertures so that said stems may be passed through said apertures in said supporting member and coöperating means comprising tightening nuts to securely clamp said supporting member to said frame.

5. In attaching devices adapted for use in attaching an automobile buffer to an automobile having flanged frame members provided with frame apertures, a plurality of angle bolt attachers, each having an inserting bend adapted to be inserted and turned in one of said frame apertures and having an alining stem and a holding portion nearly in line with said stem, said holding portion and the adjacent portion of said stem being of substantially equal cross-sectional area, and coöperating alining fastening means to engage said alining stem and clamp said holding portion against the coöperating frame member and hold said alining stem against loosening angular displacement.

6. In attaching devices adapted for use in securing an attachment to an automobile having frame members provided with frame apertures, a plurality of angle attachers, each having an inserting bend adapted to be inserted and turned in one of said frame apertures and having an alining stem adapted to coöperate with a supporting member of the attachment, and coöperating securing means to clamp said attachers against the coöperating frame member and hold said alining stem against loosening angular displacement.

7. In attaching devices adapted for use in securing an attachment to an automobile having frame members provided with frame apertures, an angle attacher having an inserting bend adapted to be inserted and turned in one of said frame apertures and having an alining stem, and coöperating securing alining means to hold said alining stem against loosening angular displacement.

8. In attaching devices adapted for use in attaching an automobile buffer to an automobile having flanged frame members provided with frame apertures, a plurality of angle bolt attachers adapted for insertion into said apertures from the outside of said frame members and each of said attachers having means for preventing its insertion into the coöperating frame aperture to an undesirable extent and having further means for preventing its undesirable rotation while the buffer is being secured in connection therewith to the coöperating frame member, and means for maintaining said attacher in alined holding position in connection with the coöperating secured parts.

9. In attaching devices adapted for use in attaching an automobile buffer to an automobile having flanged frame members provided with frame apertures, a plurality of bolt attachers adapted for insertion into said apertures from the outside of said frame members and each of said attachers having means for preventing its undesirable rotation while the buffer is being secured in connection therewith to the coöperating frame members, and means for maintaining said attacher in alined holding position in connection with the coöperating secured parts.

10. In attaching devices adapted for use in attaching an automobile buffer to an automobile having flanged frame members provided with frame apertures, a plurality of attachers having laterally projecting holding portions adapted to be inserted into said apertures from the outside of said frame members and each of said attachers having means for preventing the insertion of said attachers into the coöperating frame apertures to an undesirable extent.

11. In attaching devices adapted for use in attaching an automobile buffer to an automobile having flanged frame members provided with frame apertures and having attached splash pan portions, a plurality of bolt attachers each having an alining stem adapted to be connected to a buffer member and thereby held in substantial alinement with respect to the frame members, and adapted to be inserted through one of said apertures from the outside of the frame member and having a laterally projecting holding portion adapted to engage the inside of the frame member adjacent the said frame aperture and prevent withdrawal of the attacher.

12. In attaching devices adapted for use in attaching an automobile buffer to an automobile having flanged frame members provided with frame apertures and having attached splash pan portions, a one-piece bolt attacher having an alining stem adapted to be inserted through one of said apertures and having an angularly projecting holding portion to prevent withdrawal of the attacher and to engage the frame member and prevent undesirable rotation of the attacher while it is securing the buffer to the coöperating frame member, the adjacent parts of said holding portion and of said stem having substantially equal cross sectional areas.

13. In attaching devices adapted for use in securing an automobile attachment to an automobile having flanged frame members provided with frame apertures and having attached splash pan portions, a one-piece bolt attacher having an alining stem adapted to be connected to a supporting member of the attachment and thereby held in substantial alinement with respect to the frame member, and adapted to be inserted through one of said apertures from the outside of the frame member and having an angularly projecting holding portion adapted to engage the frame member adjacent the said frame aperture and prevent withdrawal of the attacher and to prevent undesirable rotation of the attacher.

14. In attaching devices adapted for use in securing an automobile attachment to an automobile having flanged frame members provided with frame apertures and having attached splash pan portions, a bolt attacher having an alining stem adapted to be connected to a supporting member of the attachment and thereby held in substantial alinement with respect to the frame member and adapted to be inserted through one of said apertures from the outside of the frame member and having a projecting holding portion adapted to engage the frame member adjacent the said frame aperture and prevent withdrawal of the attacher.

15. In attaching devices adapted for use in securing an automobile attachment to an automobile having flanged frame members provided with frame apertures and having attached splash pan portions, an attacher having an alining stem adapted to be connected to a supporting member of the attachment and having a projecting holding portion adapted to engage the frame member and prevent withdrawal of the attacher.

16. In automobile buffers, an automobile having flanged frame members provided with frame apertures and a splash pan coöperating with the inner sides of said frame members, a buffer having supporting members adapted to coöperate with said frame members and attachers having alining engagement with said supporting members and having ends adapted to be inserted through said frame apertures from the outer sides of said frame members and provided with externally operated means for tightening said attachers into holding engagement with the inner portions of said frame members to secure said supporting members thereto and means to prevent the undesirable rotation of said attachers during the tightening thereof.

17. In automobile buffers, an automobile having flanged frame members provided with frame apertures and a splash pan substantially closing the inner sides of said frame members, a buffer having supporting members adapted to coöperate with said frame members and attachers having stems the ends of which are adapted to be inserted through said frame apertures from the outer sides of said frame members and provided with externally operated means coöperating with the outer sides of said frame members for tightening the holding portions of said attachers projecting laterally from said stems in holding engagement with said frame members to secure said supporting members thereto.

GEORGE ALBERT LYON.